Patented Feb. 23, 1954

2,670,349

UNITED STATES PATENT OFFICE 2,670,349

BASICALLY SUBSTITUTED DERIVATIVES OF N - ARALKYLCYCLOALKYLALKANAMIDES AND THEIR SALTS

John W. Cusic, Skokie, Ill., assignor to G. D. Searle & Co., Chicago, Ill., a corporation of Illinois No Drawing. Application June 8, 1951, Serial No. 230,709

14 Claims. (Cl. 260—247.2)

The present invention relates to a new group of organic amides and more particularly to basically substituted derivatives of N-aralkyl-cycloalkylalkanamides of the following structural formula and salts thereof:

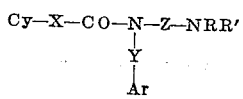

wherein Cy is a lower cycloaliphatic hydrocarbon radical, X and Y are saturated bivalent lower aliphatic hydrocarbon radicals, Z is a saturated bivalent lower aliphatic hydrocarbon radical containing more than one carbon atom, Ar is a lower aryl radical of the class consisting of hydrocarbon, halogenated hydrocarbon, and alkoxylated hydrocarbon radicals and NRR' is a member of the class consisting of dialkylamino radicals and nitrogen-containing saturated heteromonocycles which are attached to the radical Z through the nitrogen in the saturated heteromonocycle.

In the foregoing structural formula Cy represents a lower cycloaliphatic hydrocarbon radical such as cyclopropyl, cyclobutyl, cyclopentyl, cyclohexyl, and cycloheptyl, or a corresponding lower-alkyl substituted cycloalkyl radical such as methylcyclopentyl, ethylcyclohexyl and the like. The bivalent radicals X, Y and Z are saturated, bivalent aliphatic hydrocarbon radicals. Such radicals are derived from straight chain or branched chain hydrocarbons and include radicals such as ethylene, propylene, butylene, amylene, hexylene, and polymethylene radicals such as trimethylene, tetramethylene, pentamethylene and hexamethylene. In addition the radicals X and Y may represent a methylene radical. The radical Ar represents a lower aromatic hydrocarbon containing 6 to 15 carbon atoms inclusive, such as phenyl, naphthyl, fluorenyl, phenanthryl, anthryl and the like. In the case of the polycyclic radicals some, but not all, of the rings may be hydrogenated as in the case of 1,2,3,4-tetrahydronaphthyl and 9,10-dihydroanthryl. Such aryl radicals can be lower-alkyl substituted as in the case of tolyl, xylyl, cumenyl, cymenyl, allylnaphthyl and the like. Within the scope of the invention are also the corresponding halogen substitution products such as fluorophenyl, chlorotolyl, bromonaphthyl, iodofluorenyl as well as lower-alkoxy derivatives, such as anisyl, phenetyl, veratryl, piperonyl, asaryl, methoxynaphthyl, methylenedioxytetrahydronaphthyl and the like.

Among the radicals which R and R' may represent are such lower alkyl groups as methyl, ethyl, propyl, butyl, amyl, hexyl, cyclobutyl, cyclopentyl and cyclohexyl, wherein the propyl, butyl, amyl and hexyl groups may be either of the straight-chain or branched-chain type. The radical NRR' can also be a saturated nitrogen-containing heteromonocyclic group attached to the radical B through a nitrogen in the heteromonocycle; examples for such heteromonocycles are: N-piperidino, N-lupetidino, N - pyrrolidino, N - morpholino, N-thiamorpholino, N'-alkyl-N-piperazino and the like.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl iodide and bromide, ethyl chloride, propyl chloride, butyl bromide, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide new chemical substances of the type indicated above. These new substances possess a number of highly useful therapeutic properties.

Thus, these amides produce a strong diuretic effect. They are of value as cardiovascular agents and have a variety of other valuable pharmacodynamic effects. The quaternary salts are useful as inhibitors of autonomic nervous functions.

In the preparation of these amides, it has been found practical in most instances to introduce the radical

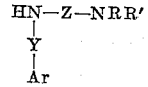

by treatment of an N-(aminoalkyl) aralkylamine of the type:

HN—Z—NRR'
  |
  Y
  |
  Ar with a cycloalkylalkanoyl halide of the type

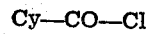

The following examples illustrate in detail certain of the compounds which comprise this invention and methods for producing same. However, this invention is not to be construed as limited in spirit or in scope thereby. It will be apparent to those skilled in the art that many modifications in materials and methods may be made without departing from the invention. In each of these examples, temperatures are given in degrees centigrade (° C.), relative amounts of materials in parts by weight and pressures during vacuum distillations in millimeters (mm.) of mercury.

EXAMPLE 1

N-(β-diethylaminoethyl)-N-benzylcyclohexaneacetamide

A mixture of 160 parts of cyclohexylacetyl chloride and 206 parts of N-(β-diethylaminoethyl)-benzylamine in 2500 parts of benzene is heated at reflux temperature for one hour. After standing at room temperature the mixture is treated with ether, and the precipitate collected on a filter and recrystallized from a mixture of equal parts of ethyl acetate and isopropanol. The hydrochloride of N-(β-diethylaminoethyl)-N-benzylcyclohexaneacetamide thus obtained melts at about 127 to 128° C. Further crystals are obtained from the filtrate upon concentration. They are worked up as the previous crop. The product has the structural formula:

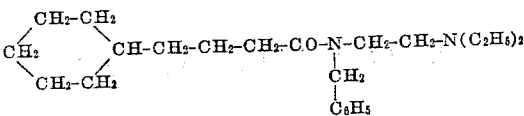

EXAMPLE 2

N-(β-diethylaminoethyl)-N-benzyl-β-cyclohexanepropionamide

A solution of 174 parts of cyclohexylpropionyl chloride and 206 parts of N-(β-diethylaminoethyl)benzylamine in 1500 parts of benzene is heated at reflux temperature for three hours. The resulting mixture is treated with ice and dilute hydrochloric acid. The acidic layer is separated and rendered alkaline by addition of sodium hydroxide, and the base extracted with ether. The ether extract is dried over anhydrous potassium carbonate, filtered and evaporated. The N-(β-diethylaminoethyl)-N-benzyl-β-cyclohexanepropionamide is then distilled at about 196 to 197° C. and 1 mm. pressure. The distillate is treated with a 25% solution of hydrogen chloride in anhydrous isopropanol. The resultant solid hydrochloride, recrystallized from ethyl acetate, melts at about 103 to 104° C. The base has the structural formula:

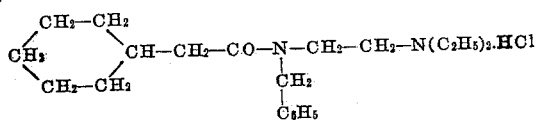

EXAMPLE 3

N-(β-diethylaminoethyl)-N-benzyl-γ-cyclohexanebutyramide

A solution of 188 parts of cyclohexylbutyryl chloride and 206 parts of N-(β-diethylaminoethyl)benzylamine in 2500 parts of benzene is heated at reflux temperature for three hours. The reaction mixture is poured on ice and extracted with dilute hydrochloric acid. The extract is rendered alkaline by addition of potassium hydroxide and the base extracted with ether. The ether extract is dried over anhydrous potassium carbonate, filtered and evaporated. The N-(β-diethylaminoethyl)-N-benzyl-γ-cyclohexanebutyramide is distilled at about 195 to 197° C. and 1 mm. pressure. The product has the following structural formula:

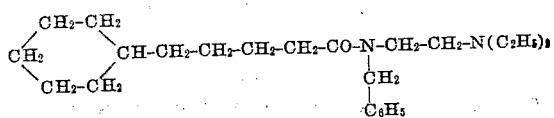

EXAMPLE 4

N-(β-diethylaminoethyl)-N-benzyl-δ-cyclohexanevaleramide

A solution of 202 parts of cyclohexylvaleroyl chloride and 206 parts of N-(β-diethylaminoethyl)-benzylamine in 2500 parts of benzene is heated at reflux temperature for three hours. The reaction mixture is treated with dilute hydrochloric acid and the aqueous layer rendered alkaline by addition of dilute sodium hydroxide. The base is extracted with ether and the ether extract dried over anhydrous potassium carbonate, filtered and evaporated. The residue is distilled at about 214 to 216° C. in 1 mm. pressure. The N-(β-diethylaminoethyl)-N-benzyl-δ-cyclohexanevaleramide has the structural formula:

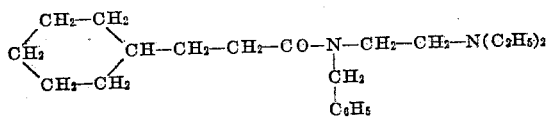

EXAMPLE 5

N-(γ-diisopropylaminopropyl)-N-[α-methyl-β-(p-bromophenyl)-ethyl]-dihydro-α-fencholenamide A mixture of 32 parts of γ-diisopropylaminopropylamine and 47 parts of 1-bromo-4-(β-chloropropyl)-benzene (prepared by the method of T. M. Patrick et al., J. Am. Chem. Soc., vol. 68, pages 1009 et seq., 1946) in 150 parts of toluene is heated at reflux temperature for twelve hours. The reaction mixture is poured over ice and treated with dilute hydrochloric acid. The acidic layer is separated and rendered alkaline by addition of ammonium hydroxide. This alkaline solution is then extracted with ether, and the ether extract is dried over anhydrous sodium sulfate, filtered and evaporated. 71 parts of N-[α-methyl-β-(p-bromophenyl)ethyl]-γ-diisopropylamine thus obtained are boiled with 38 parts of dihydro-α-fencholenyl chloride in 1000 parts of benzene under a reflux condenser for three hours. After cooling, the mixture is treated with dilute hydrochloric acid and the acidic layer separated and rendered alkaline by addition of ammonium hydroxide. The alkaline solution is extracted with ether and the ether extract dried over anhydrous potassium carbonate. The solution is then stirred with decolorizing charcoal, filtered and evaporated. The slightly yellowish oily residue consists of N-(γ-diisopropylaminopropyl)-N-[α-methyl-β-(p-bromophenyl)ethyl]-dihydro-α-fencholenamide which has the structural formula shown below:

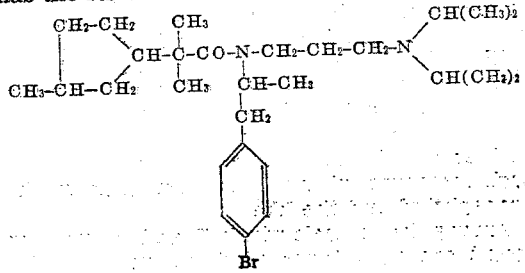

A white crystalline hydrochloride is obtained by treatment of the base with one equivalent of a 25% solution of hydrogen chloride in anhydrous isopropanol. The initially oily product is crystallized by concentration and chilling.

EXAMPLE 6

*N - [β - (2,5 - dimethylpyrrolidino) ethyl]-N-[β-(6 - methoxynaphthyl) ethyl] cyclopropaneacetamide*

A mixture of 138 parts of 1-(β-aminoethyl)-2,5-dimethylpyrrolidine and 265 parts of 1-(β-bromoethyl) - 6 - methoxynaphthalene (prepared by the method of W. E. Bachmann et al., J. Am. Chem. Soc., vol. 62, pages 824 et seq., 1946) in 1200 parts of xylene is heated at reflux temperature for 12 hours. The reaction mixture is then poured over ice and treated with hydrochloric acid. The acidic layer is separated and rendered alkaline by addition of sodium hydroxide. The base is extracted with ether and the ether extract dried over anhydrous potassium carbonate, filtered and evaporated. 64 parts of N-[β-(2,5-dimethylpyrrolidino) ethyl] - 6 - methoxynaphthalene-ethylamine thus obtained are boiled with 24 parts of cycylopropaneacetyl chloride in 200 parts of benzene under a reflux condenser for 4 hours. The resulting mixture is cooled and treated with dilute hydrochloric acid. The aqueous layer is separated, washed with ether and rendered alkaline by addition of sodium hydroxide. The base is extracted with ether and the extract dried over anhydrous sodium sulfate, stirred with decolorizing charcoal, filtered and evaporated. The resulting oil is lightly colored and has the structural formula:

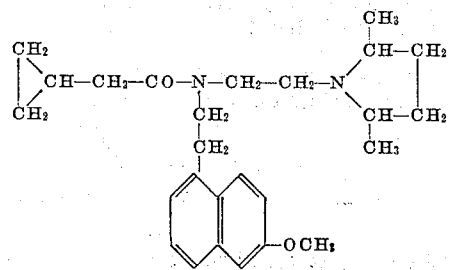

EXAMPLE 7

*N-(β-morpholinoethyl) - N - benzylcyclohexaneacetamide*

A solution of 253 parts of benzyl chloride and 600 parts of 4-(β-aminoethyl) morpholine in 2600 parts of toluene is heated at reflux temperature for 10 hours and then cooled and filtered. The filtrate is distilled in vacuum and then refractionated at about 135 to 140° C. and 1 mm. pressure. 220 parts of the 4-(β-benzylaminoethyl) morpholine thus obtained are mixed with 165 parts of cyclohexylacetyl chloride in 1600 parts of benzene and heated at reflux temperature for 10 hours. The reaction mixture, which is partly solid, is treated with ice and dilute hydrochloric acid. The aqueous layer is separated, rendered alkaline by addition of sodium hydroxide and extracted with ether. The ether extract is dried over anhydrous potassium carbonate, filtered and evaporated. The residue is distilled at about 208 to 210° C. and 2 mm. pressure. The N-(β-morpholinoethyl) - N - benzylcyclohexaneacetamide thus obtained is treated with one equivalent of a 25% solution of hydrogen chloride in isopropanol. The resulting hydrochloride solidifies on standing; recrystallized from a mixture of ethyl acetate and isopropanol it melts at about 156 to 157° C. It has the structural formula:

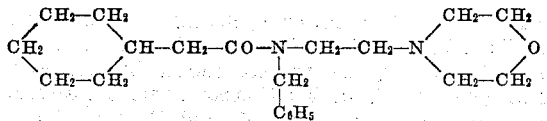

EXAMPLE 8

*N-(δ-piperidinobutyl) -N-[β(3,4-dimethylphenyl) ethyl] -cyclobutaneacetamide*

A mixture of 156 parts of 1-(δ-aminobutyl)-piperidine and 169 parts of 4-(β-chloroethyl)-o-xylene in 1200 parts of toluene is heated at reflux temperature for ten hours. The reaction product is poured over ice and treated with dilute hydrochloric acid. The aqueous layer is rendered alkaline by addition of sodium hydroxide and then extracted with ether. The ether extract is dried over anhydrous sodium sulfate, filtered and evaporated. 288 parts of N-(δ-piperidinobutyl)-3,4-dimethylphenethylamine thus obtained are boiled with 133 parts of cyclobutaneacetyl chloride and 2000 parts of benzene at reflux temperature for three hours. After cooling, the mixture is treated with dilute hydrochloric acid. The acidic layer is separated, shaken with ether, and then rendered alkaline with dilute sodium hydroxide and extracted with ether. The ether extract is dried over anhydrous potassium carbonate, stirred with decolorizing charcoal, filtered and evaporated. The resulting oil consists of N-(δ-piperidinobutyl) - N - [β - (3,4 - dimethylphenyl) ethyl] cyclobutaneacetamide which has the structural formula shown below. A white crystalline hydrochloride is obtained by treatment with alcoholic hydrogen chloride. The initially oily product is crystallized by concentration and cooling. The base has the structural formula:

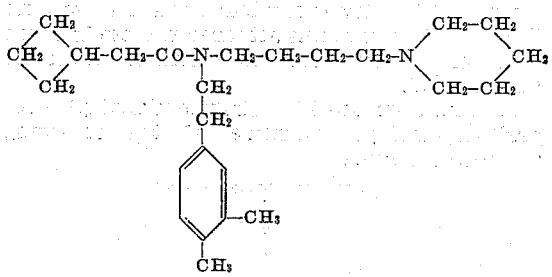

I claim:

1. A basically substituted N-aralkyl-cycloalkyl-alkanamide of the following structural formula:

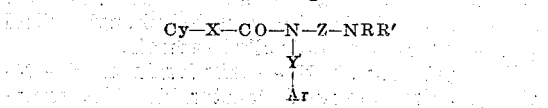

wherein Cy is a lower cycloalkyl radical; X and Y are lower alkylene radicals; Z is a lower alkylene radical separating the two nitrogen atoms attached thereto by more than one carbon atom; Ar is a member of the class consisting of phenyl and naphthyl radicals, lower alkylphenyl and halophenyl radicals; and NRR' is a member of the class consisting of lower dialkylamino radicals, morpholino radicals, pyrrolidino radicals and piperidino radicals.

2. An N - dialkylaminoalkyl - N - aralkylcycloalkylalkanamide of the following structural formula:

$$Cy-X-CO-N(Y)(Ar)-Z-NRR'$$

wherein Cy is a lower cycloalkyl hydrocarbon radical, X and Y are lower alkylene radicals, Z is a lower alkylene radical separating the two nitrogen atoms attached thereto by more than one carbon atom, Ar is phenyl, and R and R' are lower alkyl radicals.

3. An N - dialkylaminoalkyl - N - phenylalkyl-cycloalkylacetamide of the structural formula:

$$Cy-CH_2-CO-N(Y)(C_6H_5)-Z-NRR'$$

wherein Cy is a lower cycloalkyl hydrocarbon radical, Y is a lower alkylene radical, Z is a lower alkylene radical separating the two nitrogen atoms attached thereto by more than one carbon atom, and R and R' are lower alkyl radicals.

4. An N - dialkylaminoalkyl - N - phenylalkyl-cyclohexaneacetamide of the structural formula:

$$\text{cyclohexyl}-CH_2-CO-N(Y)(C_6H_5)-Z-NRR'$$

wherein Y is a lower alkylene radical, Z is a lower alkylene radical separating the two nitrogen atoms attached thereto by more than one carbon atom, and R and R' are lower alkyl radicals.

5. An N - dialkylaminoalkyl - N - benzyl-cyclohexane-acetamide of the structural formula:

$$\text{cyclohexyl}-CH_2-CO-N(CH_2C_6H_5)-Z-NRR'$$

wherein Z is a lower alkylene radical separating the two nitrogen atoms attached thereto by more than one carbon atom and R and R' are lower alkyl radicals.

6. A halogenated N - dialkylaminoalkyl - N-aralkylcycloalkylalkanamide of the following structural formula:

$$Cy-X-CO-N(Y)(Ar)-Z-NRR'$$

wherein Cy is a lower cycloalkyl hydrocarbon radical, X and Y are lower alkylene radicals, Z is a lower alkylene radical separating the two nitrogen atoms attached thereto by more than one carbon atom, Ar is a halogenated phenyl radical and R and R' are lower alkyl radicals.

7. A halogenated N - dialkylaminoalkyl - N-phenyl - alkyl - cycloalkylacetamide of the structural formula $$Cy-CH_2-CO-N(Y)(\text{halogenated phenyl})-Z-NRR'$$

wherein Cy is a lower cycloalkyl hydrocarbon radical, Y is a lower alkylene radical, Z is a lower alkylene radical separating the two nitrogen atoms attached thereto by more than one carbon atom, and R and R' are lower alkyl radicals.

8. N - (β - diethylaminoethyl) - N - benzyl-cyclohexaneacetamide.

9. An N - dialkylaminoalkyl - N - phenylalkyl-cycloalkylpropionamide of the structural formula $$Cy-C_2H_4-CO-N(Y)(C_6H_5)-Z-NRR'$$

wherein Cy is a lower cycloalkyl radical; Y is a lower alkylene radical; Z is a lower alkylene radical separating the two nitrogen atoms attached thereto by more than one carbon atom; and R and R' are lower alkyl radicals.

10. An N - dialkylaminoalkyl - N - benzyl-cyclohexanepropionamide of the structural formula $$\text{cyclohexyl}-C_2H_4-CO-N(CH_2C_6H_5)-Z-NRR'$$

wherein Z is a lower alkylene radical separating the two nitrogen atoms attached thereto by more than one carbon atom, and R and R' are lower alkyl radicals.

11. An N - morpholinoalkyl - N - phenylalkyl-cycloalkylalkanamide of the structural formula $$Cy-X-CO-N(Y)(C_6H_5)-Z-N(\text{morpholino})$$

wherein Cy is a lower cycloalkyl radical; X and Y are lower alkylene radicals; and Z is a lower alkylene radical separating the two nitrogen atoms attached thereto by more than one carbon atom.

12. An N - morpholinoalkyl - N - phenylalkyl-cyclohexaneacetamide of the structural formula $$\text{cyclohexyl}-CH_2-CO-N(Y)(C_6H_5)-Z-N(\text{morpholino})$$

wherein Y is a lower alkylene radical and Z is a lower alkylene radical separating the two nitrogen atoms attached thereto by more than one carbon atom.

13. N - (β - morpholinoethyl) - N - benzyl-cyclohexaneacetamide.

14. An N - heterocycloalkyl - N - phenylalkyl-cycloalkylalkanamide of the structural formula $$Cy-X-CO-N(Y)(C_6H_5)-Z-N(CH_2)$$

wherein Cy is a lower cycloalkyl radical; X and Y are lower alkylene radicals; and Z is a lower alkylene radical separating the two nitrogen atoms attached thereto by more than one carbon atom.

JOHN W. CUSIC.

References Cited in the file of this patent
UNITED STATES PATENTS

| Number | Name | Date |
| --- | --- | --- |
| 2,009,144 | Miescher et al. | July 23, 1935 |
| 2,298,665 | Hentrich | Sept. 15, 1942 |
| 2,350,324 | Coleman | June 6, 1944 |